Figure 1:
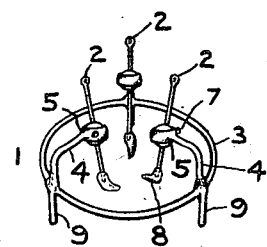

R. W. SWEETNAM.
PROCESS OF FORMING DENTAL RESTORATION.
APPLICATION FILED DEC. 18, 1913.

1,244,257.

Patented Oct. 23, 1917.
2 SHEETS—SHEET 1.

WITNESSES:
R. G. Allen.
F. E. Aul.

INVENTOR.
Robert W Sweetnam
by
Owen, Owen & Crampton

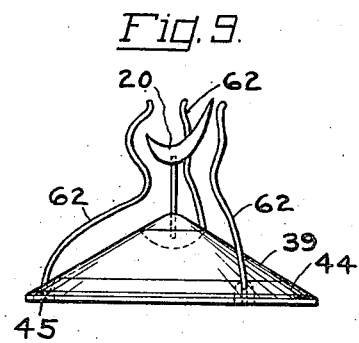
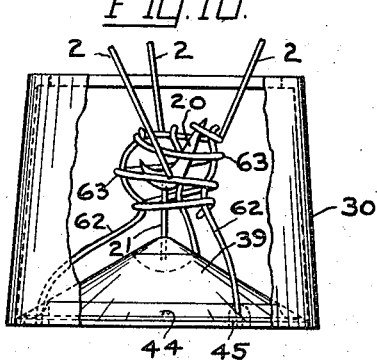
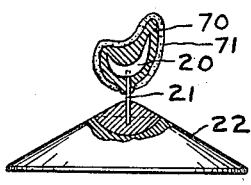
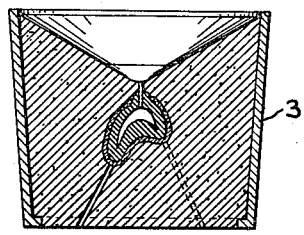
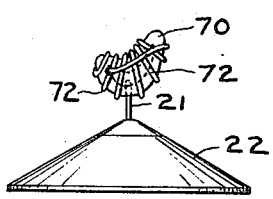
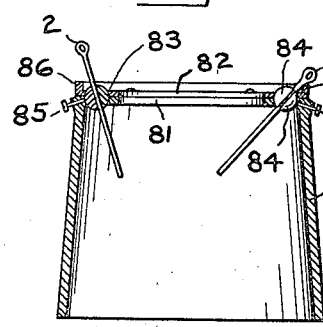
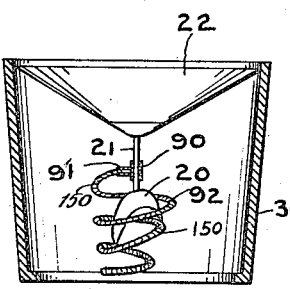
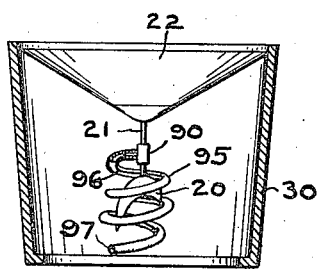
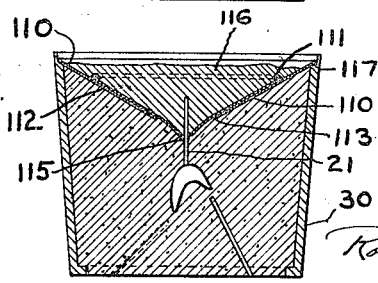

UNITED STATES PATENT OFFICE.

ROBERT W. SWEETNAM, OF TOLEDO, OHIO.

PROCESS OF FORMING DENTAL RESTORATION.

1,244,257. Specification of Letters Patent. Patented Oct. 23, 1917.

Application filed December 18, 1913. Serial No. 807,453.

*To all whom it may concern:*

Be it known that I, ROBERT W. SWEETNAM, a citizen of the United States, and a resident of Toledo, in the county of Lucas and State of Ohio, have invented a certain new and useful Process of Forming Dental Restoration; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to processes of forming dental restorations, such as inlays, bridges, plates, etc. It particularly has for its object to produce castings that for all practical purposes conform perfectly with the configuration to be restored.

By my invention, air is removed from and drawn toward or directed to one or more points located in the vicinity of the molded cavity, before, during, or after the filling of the cavity with molten fluid or molded or plastic material. Points are selected according to the shape of the castings to be made, according to the way the metal should be cooled in its several parts, according to the way the metal should be first placed and held while the cavity is being filled, in order that the metal may be drawn to or forced into the minutest recesses and most remote parts in the molded cavity, or cooled, or pressed, or forced to shape to prevent globular formation, or in order that the metal may be cooled uniformly by the passing of the air to prevent distortion and warping or in order to enlarge the casting which overcomes the effect of contraction. The outer edges and surface thus become sharp and defined and the cast solid throughout and practically a reproduction of the pattern.

I shall describe hereinafter, processes in which the use of my invention is involved and will illustrate in the drawings and describe certain apparatus usable in the conduct of my invention.

Figure 2:
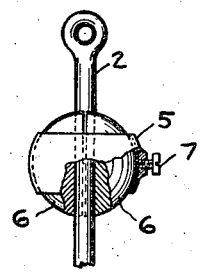
Figure 3:
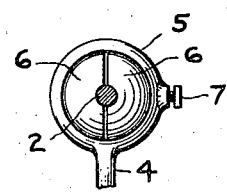
Figure 4:
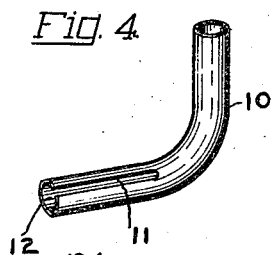
Figure 5:
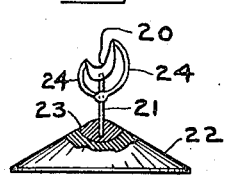
Figure 6:
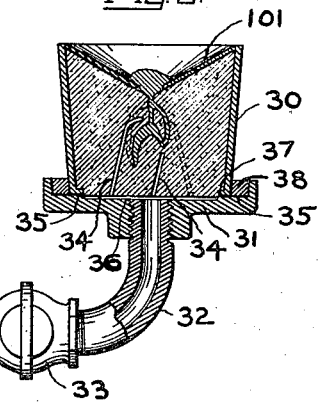
Figure 17:
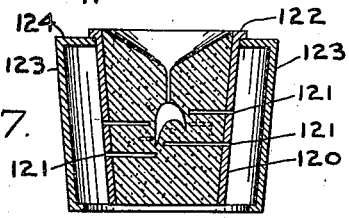
Figure 7:
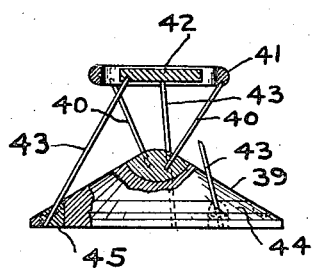
Figure 8:
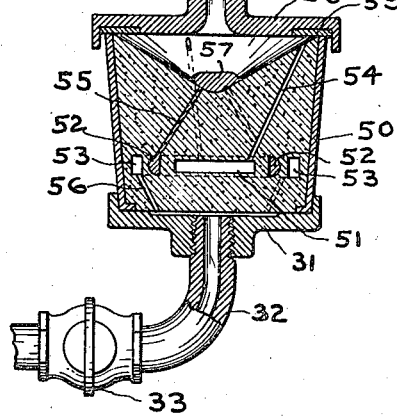

In the drawings Figure 1 illustrates a means for forming equalizing passages in the mold. Fig. 2 is an enlarged view of one of details shown in Fig. 1. Fig. 3 is a top view of the detail of construction shown in Fig. 2. Fig. 4 is an angular perforated tube for forming equalizing passages. Fig. 5 shows the pattern mounted. Fig. 6, shows the cast completed and the manner in which the mold is treated. Fig. 7 shows an arrangement of patterns mounted ready for molding. Fig. 8 shows the cast of the pattern shown in Fig. 7 completed. Fig. 9 shows a method of supporting the pattern and the material for forming equalizing passages. Fig. 10 shows the connections and mounting completed. Fig. 11 shows a further modification, wherein the pattern is coated. Fig. 12 shows the cast of the pattern of Fig. 11 completed. Fig. 13 shows a modification of the processes illustrated conventionally in Fig. 11. Fig. 14 is a modification of the equalizing device shown in Fig. 1. Fig. 15 shows a modified method of supporting the material for forming equalizing passage. Fig. 16 illustrates a further modification of the device shown in Fig. 15. Fig. 17 illustrates conventionally a method of permitting the air to press only upon the surface of the metal located on the outside of the metal. Fig. 18 illustrates a further modification of the device shown in Fig. 14.

1, in Fig. 1, is the device which I have termed the equalizer or regulator. 2 are adjustable rods which are adjustably supported with reference to a frame 3. The frame 3 may be located on an investment cup or flask, and the rods may be extended into the investment cup or flask. The rods are supported by cranes or brackets 4, which extend over the interior of the cup. Their inner ends are provided with rings 5. In the rings 5 are located hemispheres 6, which fit around the rods 2 and socket in the rings 5. Each ring is provided with a small screw 7, which presses upon the hemispheres 6 to hold the rods in position. The screws 7 may be unscrewed and the rods 2 may be shifted longitudinally and held angularly in the desired positions and then the screw 7 may be screwed to clasp the hemispheres about the rod and lock the hemispheres in position, whereby the rods 2 will be held in adjusted position, both longitudinally and angularly in the investment cup or flask.

The lower ends of the rods 2 may be provided with passage forming bodies made of a material, which will, when heated, become melted and absorbed by the porous mold, such as wax or wax-like materials, which may be termed disappearing materials. The feet or angular points 8 may be varied or shaped according as it may be desired to form passages about, above, or below the pattern to be molded.

The frame 3 may also be provided with downwardly extending lugs 9, which are extensions of the brackets 4 and will aid in holding the frame in position on the flask.

Split or perforated tubes 10 such as that shown in Fig. 4 may be inserted on the ends of the rods 2. The tube may be bent to any desired shape. The tube 10 may be provided with a slit 11. The ends of the rods are inserted in the ends of the tubes so that when the rods 2 are withdrawn they will leave the tubes 11 in the investment. The slit 11 and the opening end 12 is closed by disappearing materials, such as waxy materials, before the flask is filled with an investment material. When the flask is heated, after the investment material is suitably dried the disappearing material used to cover the slit 11 and the opening 12 will be absorbed by the investment material or driven out through the openings formed in the mold by withdrawal of the supporting rods 2.

In the conduct of the processes involving my invention, the pattern 20 formed of wax is supported upon a sprue wire 21, as shown in Fig. 5. The sprue-wire 21 is supported upon the sprue-former 22. The sprue-former 22 may be provided with an opening 23 filled with a wax-like material which is adapted to receive the sprue wire 21. In order that the metal may reach the extreme, smaller or finer points or parts of the matrix or cavity formed by the pattern 20, by-passages may be formed in the mold leading from the sprue-hole to the extremities or finer or sharper points of the molded cavity. This is accomplished by connecting the edges or corners of the pattern 20 with the sprue-wire 20 with a strip of disappearing material 24.

The flask 30 is then placed over the sprue former 22. The equalizer 1, as shown in Fig. 1, is placed over the top of the flask 30 and the rods 2 are so adjusted as to bring them in the vicinity of points from whence it is desired to remove the air. The feet 8 are shaped and the rods are located so as to bring their ends at the desired points relative to the pattern 20 and so as to form passage ways in the mold along desired parts of the pattern.

The investment cup 30 is then filled with the porous investment material in a plastic condition. It fills in around the pattern 20, the disappearing strips 24 and the rods 2, and their angular or sharpened extremities 8 or around the split tubes 10 if they are placed on the rods 2. When the investment material has set and suitably dried, the rods 2 are withdrawn which leave the tips or points 8 of waxy material within the investment material or, if the tubes 10 are used in place of the tips 8, they will be left in the investment material, together with the disappearing material with which the openings of the tubes are plugged or covered. The flask is then subjected to heat and the wax pattern and the disappearing material in the mold are melted and finally absorbed by the investment material and if the heat is sufficiently great, it will be burnt out or driven off as a gas through the openings. This leaves passage ways in the mold around the matrix or molded cavity. The mold thus formed is illustrated in Fig. 6.

The mold is then centrally seated upon a plate pneumatically connected with a system or apparatus having vacuum capacity. Metal is then placed over the sprue-hole and melted or molten metal is poured into the sprue-hole. It passes into the cavity formed by the pattern and through the by-passages leading to the extreme or other desired points of the matrix except so far as it may be prevented by the air contained in the cavity formed in the mold. The connection with the vacuum producing apparatus is then opened and the air is withdrawn from the passages 34. The air is thus drawn through the walls of the molded cavity at points where it is essential to remove the air. The metal will thus be held and allowed to form in a substantially uniform vacuous surrounding. The vacuous condition will work out through the investment material from the passages as well as work up from the bottom of the mold so as to draw the air away from the pattern. In order to regulate the pressure brought to bear upon the surface of the metal in the sprue-hole, the flask may be covered or coated, and be placed under a compression cap 58 and air under pressure may be directed in between the cap and the coating or covering on the investment material in the flask which will press upon the surface of the metal in the sprue-hole. This pressure will be hydrostatically transmitted to the molten metal contained in the molded cavity and the wall of the cavity will be pressed outward in all directions. The investment material being more or less compressible and the air being withdrawn from the investment material contained in the flask and principally from the investment material surrounding the molded cavity, the cavity enlarges according to the pressure of the air directed upon the surface of the molten metal in the sprue-hole. Expansibility of parts of the walls of the cavity, such as the inner wall, may be modified with respect to the expansibility of the other parts of the wall of the cavity by varying the thickness or distance between the molded cavity and the air passage from which the air is withdrawn or by directing air under pressure to parts in the vicinity of parts of the wall of the cavity thus sustaining it such as directing air under pressure into a cavity located within a ring, as illustrated in Fig. 8. The passages extending above and around the pattern at substantially all its outer or extreme points the molten metal will be equally pressed into the cavity and outward in all directions by the air pressing upon its surface in the sprue of the mold and transmitting its pressure down through the sprue-hole and the by-passage to the molten metal in the cavity. By this method the pressure of the fluid metal against the wall of the molded cavity is equalized and the air is pressed and drawn out in all directions which prevents globular formation and permits the metal to be pressed into the finest edges and corners of the molded cavity and held in position while it solidifies.

The plate 31 is provided with a seat 35. The interior portion 36 of the plate is depressed. The flask 30 is provided with an inturned portion 37 which coöperates with the seat 35 to make a perfect air tight connection. The mold being formed of investment material which is more or less granular when dried, particles sometimes break off particularly from the trimmed end of the investment cup and from the edges of the cavity formed by withdrawing the rods 2. The particles fall into the depression 36 which is deep enough to avoid the formation of any space between the lower edge of the flask and the seat 35 through which air would pass. The plate 31 may be made for flasks of different sizes by forming a wide annular seat 35. The smaller flasks may be centered by using rings of different sizes. The ring 38 may be inserted or placed on the plate 31 and the smaller flask 30 placed in the ring.

If it is desired, a casting may be distended by air pressure. This may be done to overcome undue contraction or to mold the metal while hot and moldable and make the casting conform to the size of the outer surface of the pattern or the metal itself may be molded by pressure while the metal is hot and pliable and made smaller than the usual cast. The method of operation whereby these things may be accomplished is conventionally illustrated in Figs. 7 and 8.

The sprue-former 22 may be provided with a plurality of sprue wires 40 which will hold the wax pattern 41 in position and will also form a plurality of passages leading from the sprue to the pattern. A second pattern 42 is also supported on the sprue-former. This may be located centrally with respect to the first pattern 41. The pattern 42 may be made of a disappearing material. The patterns may be metallic, perforated hollow forms having the openings therein filled with wax. The pattern 42 is located centrally with respect to the pattern 41 and is supported by wires 43. The wires 43 are supported on the sprue-former 22. The outer edge of the sprue-former 22 may be provided with a groove 44 as shown in Figs. 7, 9 and 10 which may be filled with wax. If desired, holes 45 may be formed in the sprue-former which extend to the groove 44. The wires 43 may be located at any point in the groove 44 or they may be located in the holes 45. When their ends are surrounded with wax in the groove 44 or in the holes 45 the rods 43 are held in position.

The flask 50 is then placed over the sprue-former and the equalizer is placed on the outer edge of the flask.

The flask 50 is then filled with a plastic investment material so that it completely surrounds the rods, the patterns and strip of wax-like material. When the investment material has set and sufficiently dried, the rods 2 are withdrawn, the equalizer removed, the flask inverted, the sprue-former 22 removed and the wires 40 and 43 withdrawn. The flask is then heated until the disappearing material is melted and absorbed by the investment material or is burnt off or driven off as a gas. It will have the cavity 51 formed by the pattern 42, the cavity 52 formed by the pattern 41. A third cavity 53 may also be formed. The cavity 51 is connected through the passage ways 54 formed by the rods 43 to the outer edge of the sprue near the outer edge of the flask. The cavity 52 formed by the pattern 41 is connected to the central parts of the sprue by means of the passages 55 formed by the wires 40 while the cavity 53 is connected to the bottom of the flask by means of the passages 56 formed by the rods 2. The flask 50 is placed upon the vacuum plate 31 and the metal is melted in the sprue of the mold or molten metal is poured into the sprue. The molten metal 57 passes down through the sprue-hole 55 to the molded cavity 52 as the air is withdrawn from the vacuum plate 31 by turning the stop-cock 33. The pressure of the air on the outer surface of the metal is transmitted through the passage ways 55 to the metal in the cavity 52 which presses the metal tightly against the outer wall of the cavity. The atmospheric air passes down through the passages 54 and enters the cavity 51 so that the air presses uniformly outward from the cavity 51 against the metal while in a moldable state and also passes to the cavity 53 whereby the metal in the cavity 52 is drawn and forced outward and also the metal is uniformly cooled by the air pressing through the porous material in the cavity 51 to the cavity 53.

If it is desired, air under pressure may be directed to the cavity 51 through the air passages 54. This is accomplished by the means shown in Fig. 8. The plate 58 having a packing ring 59 is placed over the upper edge of the flask 50. The plate 50 is connected with a pipe 60 which may in turn be connected to a pump or with an apparatus having air under pressure. The air will then be forced down through the passages 54 and the cavity 51 and against the metal. The metal in the cavity 52 while in a moldable state, will be forced outward and if the air pressures in the cavities are properly manipulated it may be forced to the outer wall and shrinkage prevented.

In Figs. 9 and 10 is shown conventionally a method of surrounding a matrix with a spiral air passage.

The general shape of the air passage may thus be made to conform with the shape of the molded cavity. Wires 62 are supported in the outer edge of the sprue-former 39, as in the trough 44 or in the holes 45 and secured in position by means of wax. The upper ends of the rods 62 are bent so as to conform to the shape of the pattern 20. A strip of disappearing material 63 is then wound around the upper ends of the wires 62 forming thereby, after the flask has been heated, a circuitous passage around the pattern. The rods 2 are then warmed slightly and brought in contact with the spiral strip 63 and a temporary sealing connection is made therewith. When the flask 30 is filled with the investment material and the sprueformer 39 and the sprue-wire 21 is withdrawn and the flask is heated the matrix and the circuitous passage are formed. The flask 30 may then be placed upon the vacuum plate 31 and the air withdrawn. This will remove all of the air from around the molded cavity which will drive the metal outward to the outer surface of the cavity in all directions to substantially the same degree so that the metal is received in a uniform low pressure environment.

In Figs. 11, 12 and 13 is shown a further modification of producing a passage conforming to the shape of the outer surface of the pattern. The pattern 20 is covered by painting the surface of the pattern 20 with, or dipping the pattern in plastic investment material, forming thereby a coat 70 on the outer surface of the pattern 20. If necessary, the pattern may be covered several times with the investment material so as to thicken the coat 70. When the coat 70 has dried it may be covered with a coat of waxy material by dipping or otherwise. If desired, the waxy material 71 may be mixed with a fibrous material or with granular material which will resist fire and form a binder or bridging points between the layer of investment material 70 and the surrounding investment material forming the mold. This will strengthen the wall or coat 70 surrounding the cavity when the pattern 20 and the disappearing material of the coat 71 is withdrawn by heating the flask. The flask 30 may then be placed over the sprue-former 22 and the equalizer 1 placed on the upper end of the flask and the rods 2 brought into sealing contact with the coat 71. The flask is then filled with investment material. When it has been sufficiently dried, the rods 2 may be withdrawn and the flask again inverted and the sprue-former 22 removed and the sprue-wire 21 withdrawn. The metal may be melted in the sprue or poured in the sprue and the connection with the vacuum pump made, whereupon the metal will be drawn into all parts of the pattern by reason of the fact that the air is drawn from the cavity producing a uniform vacuous condition around the cavity. Inasmuch as the coat 71 contains asbestos fiber or a granular fire resisting material, the fiber or the particles will remain in the cavity formed by melting the disappearing material contained in the coat 71 and will form bridging points between the surfaces of the cavity and will hold the wall formed by the coat 70 in position in the flask 30 after the mold has been completed and will also prevent cracking by the heat of the metal. When the metal is melted or poured and the air is withdrawn from the surrounding cavity, the metal will be drawn outward in all directions by the suction.

As shown in Fig. 13 the coat 70 may be wound by a strip 72 of disappearing material. It may be wound around the coat 70 and crossed in all directions. This will leave small spaces in between the windings of the strip. The pattern is then placed in the flask 30 and the flask is filled with investment material after connection has been made with the rods 2. The investment material will penetrate between the windings of the strip 72 and form a close sealing connection with the coat 70 so that when the investment material has been dried and the pattern 20 removed, and the disappearing material of the strip 72 driven off, the wall 70 of investment material will be held securely in place by the surrounding bridging parts formed by the investment material penetrating between the windings of the strips 72.

In Fig. 14 is shown a modification of the device shown in Fig. 1. In the device shown in Fig. 14, rods 2 are supported on the flask 80. The flask 80 is provided with an inturned flange 81 and an annular collar 82. The flange 81 and the collar 82 are provided with spherical openings 83 which fit over and inclose the hemispheres 84. The rods 2 extend between and are clamped by the hemispheres 84 in the same manner that they are clamped by the device shown in Fig. 1. Screws 85 pass through the outer wall of the flask 80 and bind against the hemispheres 84 so that the rods 82 may be adjusted longitudinally and angularly with respect to the interior of the flask and securely clamped in position by the screws 85. The upper edge 86 of the collar 82 extends above the flange 81 and the hemispheres 84 in order to provide a seat for the flask 80 when it is placed upon the vacuum plate 31.

In Fig. 15 is shown a modification of the means for supporting strips of disappearing material. The strip containing disappearing material may be bent to any shape. If desired, it may be bent so as to spirally surround the pattern 20. It is supported by means of the ferrule 90 which may be mounted on the sprue-wire 21 at any desired point. It is provided with a thimble 91 extending at right angles to the ferrule 90. The inner end of the thimble 91 is closed so as to prevent communication between the passages produced by the sprue wire and the strip. The strip is inserted into the thimble 91. The strip of disappearing material 92 may contain or be wound with a strand of wire 150, which will hold it in position while the flask 30 is being filled with the plastic investment material. The strip 92 may be continued through to the bottom of the flask 30 or it may terminate in the vicinity of the bottom of the flask. The sprue-former 22 is removed and the sprue wire 21 is withdrawn leaving the ferrule 90 and the strip 92 in the mold. The flask is then heated and the disappearing material contained in the strip 92 is absorbed by the porous investment material. The pattern 20 also passes off as a gas and is partially absorbed by the investment material. If the strip 92, while in the process of formation of the mold, extends to the bottom forming a connecting passage to the interior, the air will be withdrawn directly from the passage surrounding the molded cavity. Or if the end of the strip 92 extends only to the vicinity of the bottom of the flask 30 the air will be drawn from the lower part of the passage through the thin wall of the investment material formed between the lower part of the passage and the vacuum plate 31. The molten metal will thus be drawn into every part of the molten cavity as above.

In Fig. 16 is shown a further modification of the device shown in Fig. 15. In Fig. 16 a slitted tube 95 is supported on or secured to the ferrule 90. The slit 96 and the opening 97 at the end of the tube 95 are filled or covered with a waxy material by dipping in wax. The flask 30 is filled with investment material and heated. Pattern 20 together with sealing material used to cover the openings of the tube 95, will be driven out or absorbed by the investment material contained in the flask. The tube may extend through the investment material or merely to a point near the bottom as in the case of the form shown in Fig. 15.

In Fig. 17 is illustrated conventionally the process applied to a further modified form of equalizer. The mold is formed in an investment material located in a flask 120, having openings 121 and a sealing flange 122. The flask 120 is supported in a shell 123. The shell is provided with an inwardly extending flange 124. The flange 122 of the flask 120 seats upon the flange 124. When the mold is formed in the flask 120, rods are inserted in the holes 121 located in the wall of the flask 120 and extend inwardly and toward the pattern to points in the vicinity of the extremities of the pattern or to points near the surface of the pattern and are located with reference to the pattern so as to obtain the results desired as heretofore explained. The flask 120 is filled with investment material and the mold completed. The sprue former and the sprue wire are withdrawn and the rods inserted in the holes of the wall of the flask are withdrawn after the investment material is dried. The disappearing material of the pattern and any disappearing material that may be used in connection with the rods inserted in the walls of the flask 120 are driven off by heating the flask and the contents and the flask 120 is inserted in the shell 123. The shell and flask is then placed upon the vacuum plate 31 whereupon air will be withdrawn from the shell and from points in the vicinity of the molded cavity through the passage ways formed by the wires previously inserted in the holes of the wall of the flask 120. If desired, a compression cap like that shown in Fig. 8 may be placed on the flange 122 and the air under pressure directed upon the surface of the investment material contained in the flask or if the sprue of the mold is covered with a non-porous coating or covering, the air pressure transmitted through the sprue hole may be made to affect the metal contained within the molded cavity.

When the flask 30 is placed upon the vacuum plate 31, the air is withdrawn from the investment material contained in the flask and from the molded cavity, whereupon the molten metal which completely covers the opening formed in the non-porous coating will be forced down by the atmospheric pressure into all parts of the cavity. The air pressure will thus be directly transmitted through the molten metal which will be forced into all parts of the molded cavity.

In Fig. 18 is also shown a means for sealing the surface of the sprue, so as to prevent the air from dissipating itself and penetrating the investment material contained in the flask or cup. The sprue former consists of a conical shaped body of sheet metal 110. It is made so as to fit the large end of the flask 30. Near the outer edge of the sprue former an inwardly-extending ridge 111 is located. A wafer of asbestos 112 suitably formed may be inserted in the under side of the sprue former 110 and crowded beyond the inwardly extending ridge 111. The wafer 112 will thus be held in position by the ridge 111. The conical body 110 is provided with a central opening 113 through which the sprue wire 21 may be inserted. The asbestos wafer is also provided with the opening 115, which is adapted to register with the opening 113. The inner edge of the wafer 112 about the opening 115 extends beyond the inner edge of the conical body or sprue former 110. The under side of the sprue former is filled with wax 116. The wax 116 aids in holding the asbestos wafer 112 in position and also penetrates within the ridges 111. The sprue wire 21 is inserted through the openings 113 and 115 into the wax 116. The pattern 20 is supported on the sprue wire. The flask 30 is placed over the sprue former 110 and is then filled with investment material. When the investment material is suitably dried and hardened the flask is inverted and the wax 116 is withdrawn. The investment material being in the nature of a cement the inner edges of the asbestos wafer 112 are securely cemented to the surface of the porous material surrounding the sprue holder, or the edge of the asbestos may be provided with a turned edge which will be filled with the cement and locked in position or it may be locked in any other manner. After removal of the wax 116, the sprue wire 21 is withdrawn. The flask is then heated which drives out all of the wax contained in the pattern and that may be used for forming air passages about the pattern, which is melted and either burnt off or driven out of the passages as a gas. The metal is then poured or melted and allowed to flow in through the sprue hole to the pattern, and sufficient metal is used so that it will cover the inner edge of the asbestos wafer about the opening 115. When the flask is placed upon the receiver-plate 31 and the air is withdrawn from the cells of the investment material the air will press at atmospheric pressure against the surface of the metal on the outside of the mold and force the metal into every part of the molded cavity. The pressure will be transmitted through the metal contained in the sprue hole, and thus it will press the metal outward in every direction. The asbestos wafer 112, being sealed to the surface of the investment material around the edges of the opening 115, the metal will not escape or be pressed upward between the asbestos wafer and the investment material. By this means the air cannot penetrate into the investment material and cannot feed to the vacuum plate through the top of the mold. Consequently the vacuum will operate to remove all the air of the investment material contained in the cup. Moreover, the air will press upon the surface of the metal in the sprue hole and this pressure will be transmitted through the metal in the sprue hole to the metal in the molded cavity and force the metal into all parts of the cavity. If the flask is placed under a compression cap, the metal in the cavity may be pressed outward in all directions by a pressure above atmospheric pressure. The investment material being more or less compressible, the cavity may be slightly enlarged sufficient to overcome the reduction in size pressed by the contraction of the metal when cooling. The compressibility of the investment material may be modified by its composition and the pressure placed on the surface of the metal in the sprue hole may also be regulated so that the size or volume may be regulated and so that the size of the cast may be regulated to the same degree.

The process involving the use of my invention which I have described may be further modified and may be used in connection with a great variety of apparatuses and devices without departing from the spirit of the invention.

What I claim as new and desire to secure by Letters Patent is as follows:

1. The process of forming dental castings which consists in forming a mold in a porous material and a bridged air space in the mold surrounding the cavity directing molten metal into the molded cavity and removing the air from the space.

2. The process of forming castings which consists in supporting a pattern and a waxed strip in the vicinity of the pattern and forming a mold about the pattern and the wax strip and heating the mold to withdraw the pattern, and wax strip directing molten metal into the molded cavity and removing the air from the space formed by the wax strip when the molded cavity is filled with molten metal.

3. The process of forming dental castings which consists in forming a mold in a porous material and spaces in the porous material at points in the vicinity of the molded cavity and supplying air to one of the spaces and removing the air from another one of the spaces.

4. The process of forming dental castings which consists in forming a mold in a porous material, forming spaces in said mold at points in the vicinity of the mold and directing air to the spaces.

5. The process of forming dental castings which consists in forming a mold in a porous material, forming spaces in said mold at points in the vicinity of the mold and supplying air under pressure to one of the spaces, and removing it from another of the spaces.

6. The process of forming dental castings which consists in forming a mold in a porous material and forming a space in said mold conforming substantially to the contour of the molded cavity and supplying air under pressure to the said space.

7. The process of forming dental castings which consists in forming a mold in a porous material and an air space conforming to the contour of the molded cavity and on the outside of the cavity, and an air space conforming to the contour of the interior surface of the cavity and removing the air from one of the said spaces and supplying air to the other of the said spaces.

8. The process of forming dental castings which consists in forming a mold in a porous material and an air space conforming to the contour of the molded cavity and on the outside of the cavity, and an air space conforming to the contour of the interior surface of the cavity and removing the air from one of the spaces and supplying air under pressure to another of the spaces.

9. The process of forming dental castings which consists in forming a mold in a compressible material, forming passages in the vicinity of the molded cavity, directing air under pressure to the surface of the molten metal to compress the material and withdrawing air from the passages.

10. The process of forming dental castings which consists in forming a mold in a porous compressible material forming a passage in the vicinity of the molded cavity and directing air under pressure to the surface of the metal while in the molten state to modify parts of the wall of the cavity.

In testimony whereof, I hereunto sign my name to this specification in the presence of two subscribing witnesses.

ROBERT W. SWEETNAM.

Witnesses:
S. T. KLOTZ,
F. E. AUL.